March 22, 1932. J. WISE 1,850,947
MEASURING DEVICE
Filed Dec. 4, 1929 2 Sheets-Sheet 1
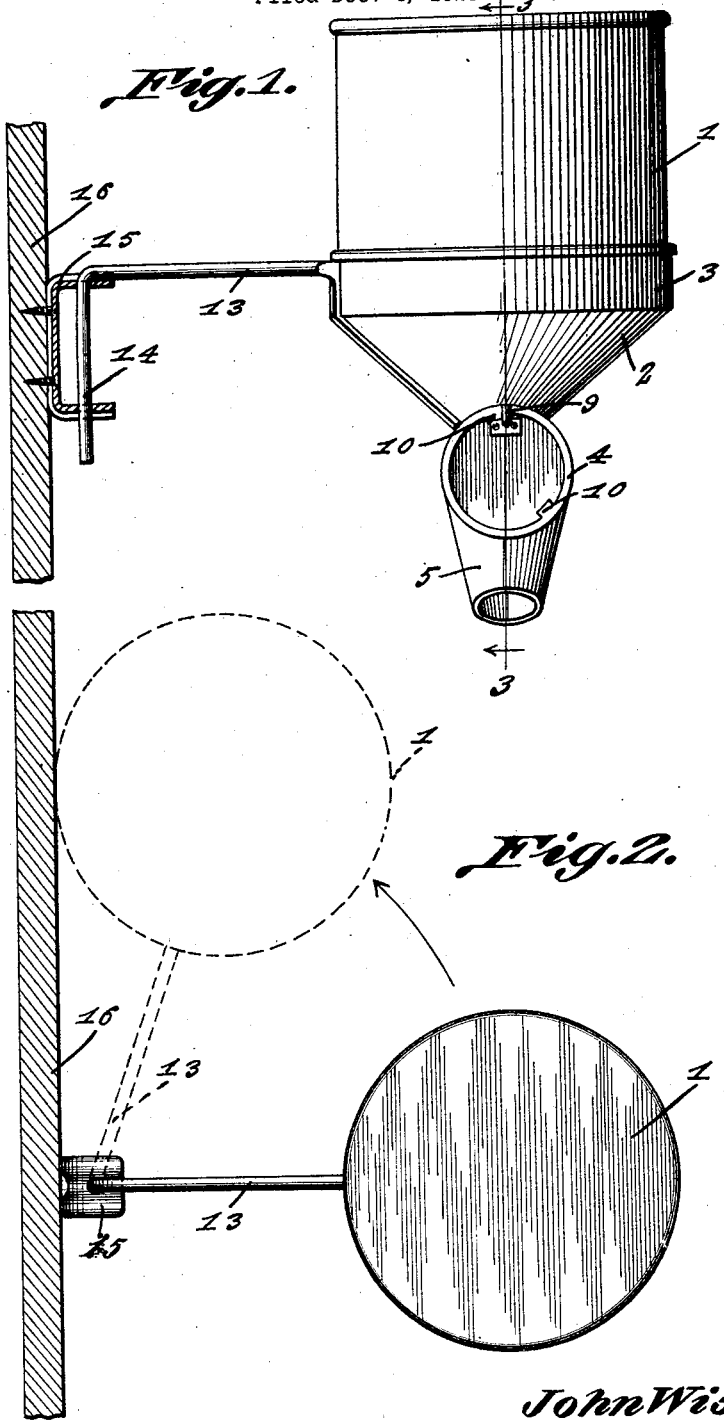
John Wise, INVENTOR
BY Victor J. Evans
ATTORNEY March 22, 1932.　　　　J. WISE　　　　1,850,947
MEASURING DEVICE
Filed Dec. 4, 1929　　2 Sheets-Sheet 2
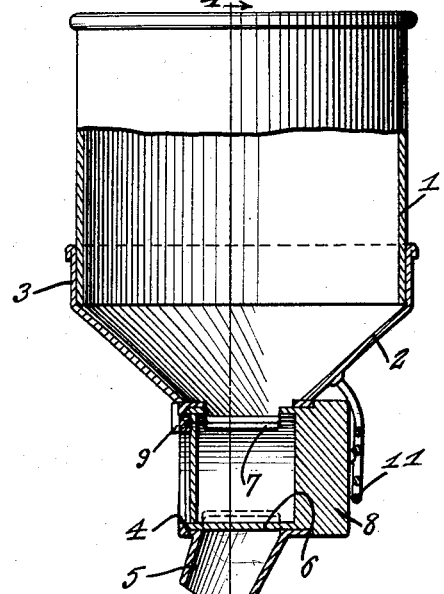
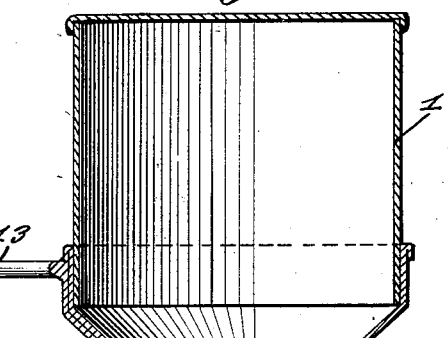
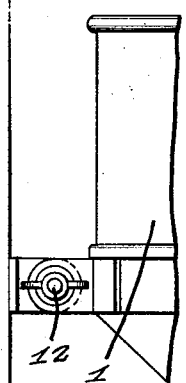
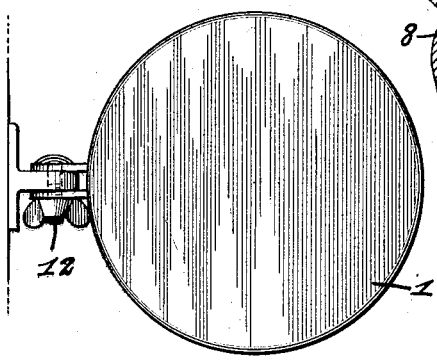
John Wise, INVENTOR
BY Victor J. Evans
ATTORNEY Patented Mar. 22, 1932

1,850,947

UNITED STATES PATENT OFFICE

JOHN WISE, OF SALINA, KANSAS

MEASURING DEVICE

Application filed December 4, 1929. Serial No. 411,645.

This invention relates to a measuring attachment for containers for coffee and other material, the general object of the invention being to provide a rotary member at the bottom of the container which is so formed that in one position, it will receive material from the container and when turned to another position, the material will be discharged so that certain amount of material can be taken from the container by rotating the member.

Another object of the invention is to provide spring means for returning the member to its receiving position after it has been turned to discharging position.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a view of the container with the attachment thereon, swingingly attached to a supporting member.

Figure 2 is a plan view of Figure 1.

Figure 3 is a sectional view on line 3—3 of Figure 1.

Figure 4 is a section on line 4—4 of Figure 3.

Figure 5 is a fragmentary side view, showing the means for clamping the funnel-shaped lower part of the container to a supporting member.

Figure 6 is a plan view of Figure 5.

In these views, the numeral 1 indicates the body of the container, which may be the original can in which the coffee or other material is sold. The numeral 2 indicates a funnel-shaped lower part having a cylindrical top part 3 in which the open end of the container 1 is fixed. The part 2 terminates in a cylindrical part 4, to the lower part of which is connected a spout 5, the walls of the part 4 having an opening in its top part which communicates with the part 2 and an opening in its lower part which communicates with the spout. A rotary member 6 passes through the cylindrical part 4 and is rotatably arranged therein and this member 6 has an opening 7 in one side thereof which, in one position of the member 6, will communicate with the part 2 and in another position, will communicate with the spout 5. The member 6 is formed with a head 8 at one end thereof by which it can be turned and a bent pin 9 is fastened to its other end which engages either one of a pair of stops 10 on the part 4, so that the rotary movement of the member 6 is limited. A coil spring 11 has one end connected with the member 6 and its other end with the part 2 and tends to hold the member 6 in a position with the opening in communication with the part 2 and out of communication with the spout.

Thus in the normal position of the member 6, material from the container will pass into the container 6 until the same is filled. Then when it is desired to use some of the material, it is simply necessary to turn the member 6 to cause the opening 7 to communicate with the spout so that the material in the member 6 will discharge through the spout. Of course, in this position, the member 6 is out of communication with the part 2. As soon as the member 6 is released, the spring will return it to normal position so that it will be again filled from the container. This member 6 is of a size to contain a tablespoonful of coffee or any other desired amount of material. A rod 13 is connected with the part 3 and has its outer end bent downwardly, as at 14, to engage holes formed in the flange of a chanel shaped bracket 15 attached to a kitchen cabinet or other support 16, so that the entire device can be swung inwardly into the cabinet, as shown in dotted lines in Figure 2, or outwardly to a position where some of the material can be taken from the container, as shown in full lines in Figures 1 and 2.

Figures 5 and 6 show a modified form of attaching the device to a wall. In these figures, a bolt 12 connects a part on the device to a bracket on the wall.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A device of the class described comprising a container having a funnel-shaped lower end, a cylinder communicating with the lower end of said container and disposed crosswise thereof, a spout depending from said cylinder, a rotary circular member within the cylinder and having an opening in one side thereof for alternate communication with the container and spout respectively, whereby in one position the member communicates with the container and in another position with the spout, and a coiled spring suspended from said lower end of the container with its coils disposed flat and next to the rotary member for normally holding the same with its opening in communication with the lower end of said container and fixed to the container and said member respectively.

In testimony whereof I affix my signature.

JOHN WISE.